US009971656B2

(12) United States Patent
Hay et al.

(10) Patent No.: US 9,971,656 B2
(45) Date of Patent: *May 15, 2018

(54) INSTANT DATA RESTORATION (75) Inventors: Gadi Hay, Haifa (IL); Eran Raichstein, Yokneam Ilit (IL); Gregory J. Tevis, Tuscon, AZ (US); Gregory D. Van Hise, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 530 days.

This patent is subject to a terminal disclaimer.

(21) Appl. No.: 12/966,049

(22) Filed: Dec. 13, 2010

(65) Prior Publication Data
US 2012/0151136 A1 Jun. 14, 2012

(51) Int. Cl.
G06F 12/16 (2006.01)
G06F 11/14 (2006.01)
G06F 11/20 (2006.01)

(52) U.S. Cl.
CPC ...... G06F 11/1456 (2013.01); G06F 11/1464 (2013.01); G06F 11/1469 (2013.01); G06F 11/2076 (2013.01); G06F 2201/84 (2013.01)

(58) Field of Classification Search
CPC ......... G06F 11/1658–11/1662; G06F 11/2082; G06F 11/1088–11/1092; G06F 11/1446–11/1469
USPC .................. 711/114, 161, 162; 714/6.1, 6.2, 714/6.22–6.31
See application file for complete search history.

(56) References Cited

U.S. PATENT DOCUMENTS

| | | | | |
|---|---|---|---|---|
| 5,742,792 A | * | 4/1998 | Yanai et al. | 711/162 |
| 5,950,230 A | | 9/1999 | Islam et al. | |
| 6,144,999 A | * | 11/2000 | Khalidi et al. | 709/219 |
| 6,671,705 B1 | | 12/2003 | Duprey et al. | |
| 7,080,198 B1 | | 7/2006 | Young | |
| 7,149,787 B1 | | 12/2006 | Mutalik et al. | |
| 7,203,796 B1 | | 4/2007 | Muppalaneni et al. | |
| 7,711,978 B1 | * | 5/2010 | Roy et al. | 714/5.11 |
| 7,822,758 B1 | * | 10/2010 | Prakash | G06F 11/1435 707/698 |

(Continued)

FOREIGN PATENT DOCUMENTS

JP 20080181416 A 8/2008
WO 9630824 A1 10/1996

OTHER PUBLICATIONS

Potyra, S., V. Sieh, and M. Dal Cin. "Evaluating fault-tolerant system designs using FAUmachine." Proceedings of the 2007 workshop on Engineering fault tolerant systems. pp. 51-54, ACM, 2007.*

(Continued)

*Primary Examiner* — Nicholas Simonetti
(74) *Attorney, Agent, or Firm* — Griffiths & Seaton PLLC (57) ABSTRACT

An exposed Internet Small Computer System Interface (iSCSI) target of a backup repository is defined as a source of, and a storage volume to be recovered as a target of, a mirrored pair of storage resources. The iSCSI target represents a point-in-time backup snapshot. Data from the iSCSI target is synchronized to the storage volume. The mechanisms of the illustrated embodiments leverage iSCSI with Instant Restore to reduce a Recovery Time Objective (RTO) and provide a secure transport when recovering a volume over a WAN.

13 Claims, 6 Drawing Sheets

(56) References Cited

U.S. PATENT DOCUMENTS

| | | | |
|---|---|---|---|
| 7,941,621 B1* | 5/2011 | Gipp et al. | 711/162 |
| 2002/0023198 A1* | 2/2002 | Kokubun et al. | 711/162 |
| 2003/0065780 A1* | 4/2003 | Maurer et al. | 709/225 |
| 2003/0212870 A1* | 11/2003 | Nowakowski | G06F 11/2082 |
| | | | 711/162 |
| 2003/0212920 A1* | 11/2003 | Fujibayashi | G06F 11/1456 |
| | | | 714/6.32 |
| 2004/0064488 A1* | 4/2004 | Sinha | 707/204 |
| 2005/0027892 A1 | 2/2005 | McCabe et al. | |
| 2007/0094465 A1* | 4/2007 | Sharma et al. | 711/162 |
| 2007/0118687 A1 | 5/2007 | McGovern et al. | |
| 2007/0245104 A1* | 10/2007 | Lindemann | G06F 11/1469 |
| | | | 711/162 |
| 2010/0077160 A1* | 3/2010 | Liu et al. | 711/162 |
| 2010/0153620 A1* | 6/2010 | McKean et al. | 711/103 |
| 2010/0169589 A1 | 7/2010 | Jalali | |
| 2010/0191927 A1* | 7/2010 | Schnapp et al. | 711/162 |

OTHER PUBLICATIONS

Xiao, Weijun, et al. "Implementation and performance evaluation of two snapshot methods on iSCSI target storages." Proc. Of NASA/IEEE Conference on Mass Storage Systems and Technologies. pp. 101-110. 2006.*

Bitton et al., "Disk Shadowing", Sep. 1988, Proceedings of Very Large Database Conference, pp. 1-3.*

Zhiwei Qu et al., "Efficient Data Restoration for a Disk-based Network Backup System," IEEE 0-7803-8599-3/04, 2004, pp. 452-458.

* cited by examiner

INSTANT DATA RESTORATION

BACKGROUND OF THE INVENTION

Field of the Invention

The present invention relates in general to data storage systems, and more particularly to apparatus and computer program product embodiments for data restoration in a computing storage environment.

Description of the Related Art

Data backups are mechanisms well known in the industry that are used to allow users to restore their data due to failure of a component, human error, software corruption, or some other type of disaster. Data backup and archive procedures are implemented to solve two basic problems—data protection against hardware, software and human failure and data retention for reference or audit purposes. The former type of protection is typically short term, i.e., data is retained so that a file or system can be recovered to a point-in-time to some point within the recent past, usually within some number of weeks. The latter is usually long term, e.g., data has to be retained and remain accessible for several years. An exemplary data protection system may involve continuous or near-continuous asynchronous replication of the data to be protected to a second location, usually as part of a secondary storage environment across a network. If the primary location fails, the data stored in the secondary location may then be restored to the primary location.

SUMMARY OF THE INVENTION

Improvements to backup and restore technologies are inherently desirable, whether to reduce bandwidth consumption, reduce the quantity of data stored and/or replicated, increase recovery time, minimize down time, or for other inherent benefits. In view of the foregoing, and specifically to address additional concerns as will be further described, following, various embodiments are provided for restoration of data (i.e., from a data backup repository) by a processor. In one embodiment, by way of example only, an exposed Internet Small Computer System Interface (iSCSI) target of a backup repository is defined as a source of, and a storage volume to be recovered as a target of, a mirrored pair of storage resources. The iSCSI target represents a point-in-time backup snapshot. Data from the iSCSI target is synchronized to the storage volume being recovered.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

There are numerous backup products in the market that provide software-based, block-level, point-in-time snapshots. There are far fewer backup products that provide Instant Restore from a snapshot. Instant Restore provides on demand access to un-restored data while a volume is being restored. This capability enables applications to be up and running within minutes after data loss while a complete recovery of a volume is performed in the background.

An overview of the Instant Restore process follows. First, a background process restores blocks from a backup snapshot to the target volume or device. Application writes are written directly to the target volume or device. Application reads (that access areas of the target volume or device that have not been restored or written to), create on demand restore requests from the backup repository. Finally, application reads that access restored areas of a target volume or device are performed as usual.

Instant Restore is a highly valuable function that dramatically reduces the Recovery Time Objective (RTO). The mechanism for providing this capability operates to create environment specific drivers for monitoring and controlling I/O access. IBM Tivoli® Storage Manager FastBack™ is an example of a product that provides Instant Restore functionality (specifically for Windows® and Linux® environments).

A potential drawback of creating the aforementioned environment specific drivers is an accompanying requirement of a large development effort to create the drivers that control the input/output (I/O) process and port these processes to additional platforms and environments. As one of ordinary skill in the art will appreciate, varying environments can include different operating system type and release levels, different file system environments, different volume managers, and such.

To address the potential drawback previously described, the illustrated embodiments provide an alternate approach for providing instant restore that dramatically reduces the development effort previously mentioned, and is operating system (OS), File system, and volume manager agnostic.

With data reduction technologies like compression, deduplication and incremental forever, it can be possible to backup data over a wide area network (WAN). However, problems may arise when restoring a volume over the WAN because the RTO is too long. An aspect of Instant Restore is the very small RTO (i.e. the total time to complete the restore is not critical from a user's perspective because they are able to gain access on-demand to the data they need). The mechanisms of the illustrated embodiments add to the benefits of Instant Restore by enabling volume or device level restores across slower speed networks. This approach makes possible a whole new set of recovery and disaster recovery solutions, including instant volume level restores across WANs and instant volume restores through online or cloud data protection services. As described in one embodiment below, for example, this approach leverages Internet Small Computer System Interface (iSCSI) with Instant Restore to reduce the RTO and provide a secure transport when recovering a volume over a WAN.

The illustrated embodiments provide approaches for integrating existing well-known technologies into a solution that provides instant restore capability over WAN distances for snapshot backups. The mechanisms of the illustrated embodiments include technologies such as the following. First, backup software that creates point-in-time snapshots of block devices is utilized. Second, backup software that uses iSCSI to expose a snapshot as an iSCSI target (based on block-level image backups kept in its repository) is utilized. Such a process is totally agnostic to the file system layout, volume management, operating system (OS) version and machine hardware exposing the target iSCSI connection. Also, when a snapshot is mounted from the backup repository, a write cache can be provided to allow write operations to be performed and maintain volume consistency while the snapshot is mounted (cache is cleared when snapshot is dismounted). Finally, Redundant Array of Independent Disks (RAID) 1 (mirroring) software is utilized as will be further described. The mechanisms of the illustrated embodiments may implement and/or incorporate aspects of the above technologies in concert to provide Instant Restore functionality as will be further described.

Figure 1:
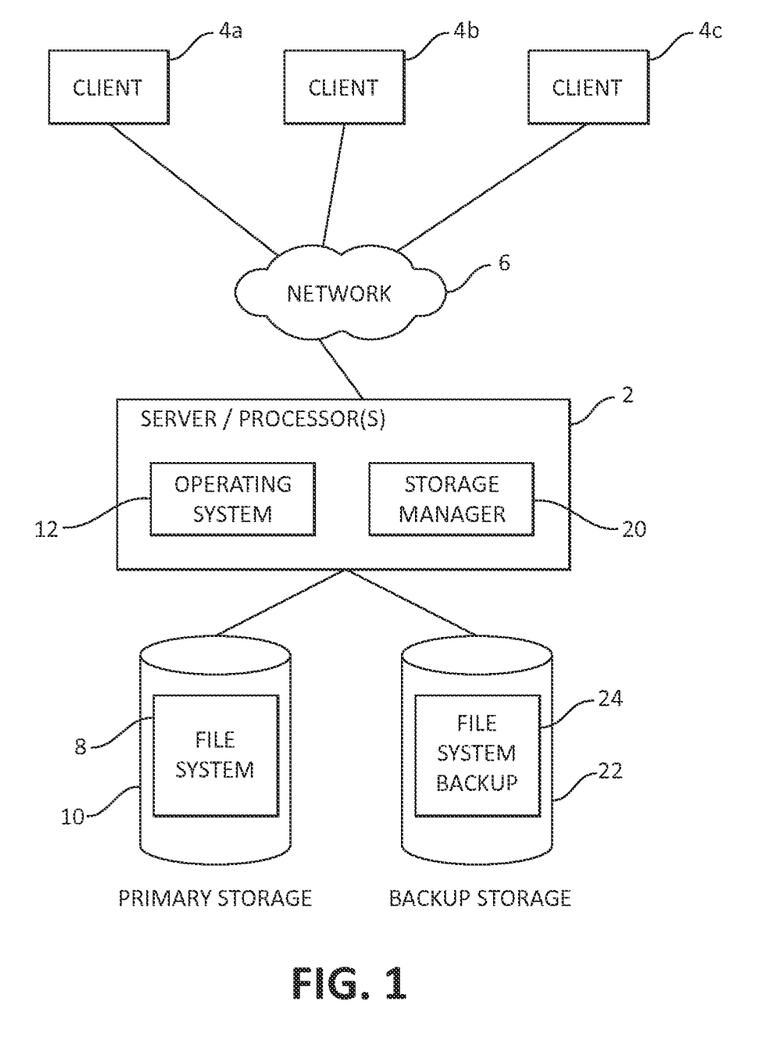
FIG. 1 is a block diagram of an exemplary computing environment in which aspects of the present invention may be realized.

Referring to FIG. 1, an exemplary computing environment is depicted in which the described embodiments may be realized. A server 2 (having at least one or more processor devices) is in communication with multiple client computers 4a, b, c over a network 6. The network 6 may comprise any network known in the art, such as the Internet, an Intranet, a Fibre Channel network, Storage Area Network (SAN), Local Area Network (LAN), etc. The multiple client computers 4a, b, c maintain a file system 8 in a primary storage system 10, which may comprise any storage system, including storage resources known in the art, such as a one or more hard disk drives, a Direct Access Storage Device (DASD), Just a Bunch of Disks (JBOD), a Redundant Array of Independent Disks (RAID), tape library, optical library, etc. The server 2 includes an operating system 12 which may comprise any server-oriented operating system known in the art, such as IBM® z/OS®, AIX®, Microsoft® Windows®, etc. The server 2 may comprise one or more server class computers. The clients 4a, b, c may comprise any computing device known in the art, such as a server class machine, a mainframe, desktop computer, laptop computer, hand held computer, telephony device, etc.

The server 2 further includes a storage manager 20 that maintains a backup copy of the file system 24, including applications and/or data, and/or storage volumes/disks in a backup storage 22. The storage manager may include a data retention manager/data retention program, which may include the functionality of any backup manager known in the art, such as the IBM® Tivoli® Storage Manager program, in addition to the functionality of the described implementations. The backup storage 22 may comprise any suitable secondary storage device for maintaining a backup copy of data, such as a disk storage, tape storage system comprised of one or more tape drives and tape cartridges, an optical disk library, etc. The server 2 may communicate with the backup storage 22 via any interface known in the art, such as a backplane interface in the server 2, parallel ports, serial ports, SCSI, iSCSI, a Fibre Channel arbitrated loop, a network, or any other interface known in the art.

The skilled artisan will appreciate that server 2 may contain various components in addition to the operating system 12 and storage manager 20 which are not shown for purposes of convenience, such as a processor(s), memory devices, adapters, and the like. For example, the storage manager 20 may operate, at least in part, as one or more processors executing the operating system 12.

In one exemplary embodiment in which various aspects may be realized with at least a portion of the hardware depicted in FIG. 1, a connection is made to an exposed iSCSI target from a backup product (which represents a point in time copy of the volume) with the target volume or device to be recovered using a common software utility that performs RAID 1 mirroring. The exposed iSCSI target and the volume to be recovered are defined as a RAID 1 mirror pair. Software mirroring is used to synch the iSCSI target with the new target volume.

A more detailed overview of the aforementioned embodiment follows. First, the RAID 1 software mirroring process synchronizes the data from the backup snapshot of a volume to the new target device. The mirror is set with the iSCSI snapshot from the backup repository as the source, and then the volume or device being recovered to is added as the target. When the secondary device that is being recovered to is added, the mirror software synchronizes the data between the two volumes. Recovery is thus done from the iSCSI volume in the backup repository to the volume that is being recovered to.

Application writes are written to the target volume and the write cache associated with the mounted iSCSI snapshot volume. Application reads for data that has not yet been synched with the target, will be read from the exposed iSCSI snapshot volume. Application reads that access data that has been synched with the target will be read from the target volume or physical disk. Employing the above techniques enables users and applications full read/write access to the target volume while it is being recovered, as if it had already been fully recovered from the mounted iSCSI snapshot volume. The mirror is split when the process is completed and all reads and writes would then go to the target device. The write cache is deleted and the target device is recovered to full functional mode.

Potential recovery environments that can be supported by mechanisms of the illustrated embodiments include the following. First, the storage unit/volume being restored is collocated (i.e. part of same LAN) with a local backup server repository is supported. Second, the storage unit/volume being restored is located remotely (e.g. over a WAN) from the backup server repository is supported. This could include scenarios that backup a local system to a cloud and use instant restore with iSCSI across a WAN for the recovery. This enables new cloud and online data recovery services not possible in the prior art. Third, several disks or volumes from a consistency group (a set of disks that were backed up together) are supported. Disks or volumes from a consistency group may be exposed together, and accordingly, a consistent recovery of such an environment can be achieved.

The mechanisms of the illustrated embodiments provide several useful advantages. For example, the mechanisms eliminate the need to develop platform specific kernel drivers to monitor and control disk I/O operations. This solution can be implemented by scripting Command Level Interface (CLI) commands associated with the backup product, software mirroring utility and iSCSI. This dramatically reduces the development expense of the solution and reduces the risk of the solution because it leverages existing/mature capabilities. In addition, the mechanisms utilize iSCSI to provide server-to-storage access over IP networks. This enables a cost-effective solution that can leverage an existing IP infrastructure to support secure transmission over a LAN or WAN. In addition, the mechanisms may be configured and used without the need to reboot storage devices, which may save valuable resources.

Figure 2A:
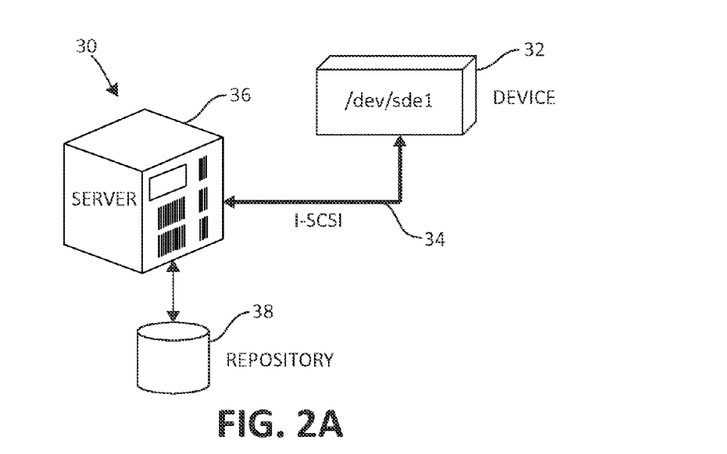
FIG. 2A is a block diagram of a first step in an exemplary method for restoring data.

Turning now to FIG. 2A, a block diagram of a first step 30 in an exemplary method for providing Instant Restore functionality is depicted. As will be seen in the exemplary embodiments depicted in FIGS. 2A-2E, following, various aspects of FIGS. 2A-2E are implemented using a Linux® operating environment. A server 36 (which, in one embodiment, includes aspects of server 2 previously depicted in FIG. 1) is configured with backup software functionality. In one embodiment, the server 36 may be an IBM® Tivoli Storage Manager (TSM) FastBack™ server. Server 36 is connected to a backup repository 38.

As illustrated and indicated previously, the server 36 is instructed, via an applicable backup software product operable on the server (such as I-Mount) to expose a previously taken snapshot as an iSCSI target in Read/Write mode (i.e., with a write cache) to a remote machine. From the storage device having the target volume for Instant Restore, iSCSI initiator commands are then issued to discover the exposed snapshot Logical Unit Name (LUN), and the LUN is made available to the system as a block device. Accordingly, device 32 is hooked via iSCSI channel 34 to the server 36, and thereby, to the applicable snapshot in the repository 38 as shown.

Figure 2B:
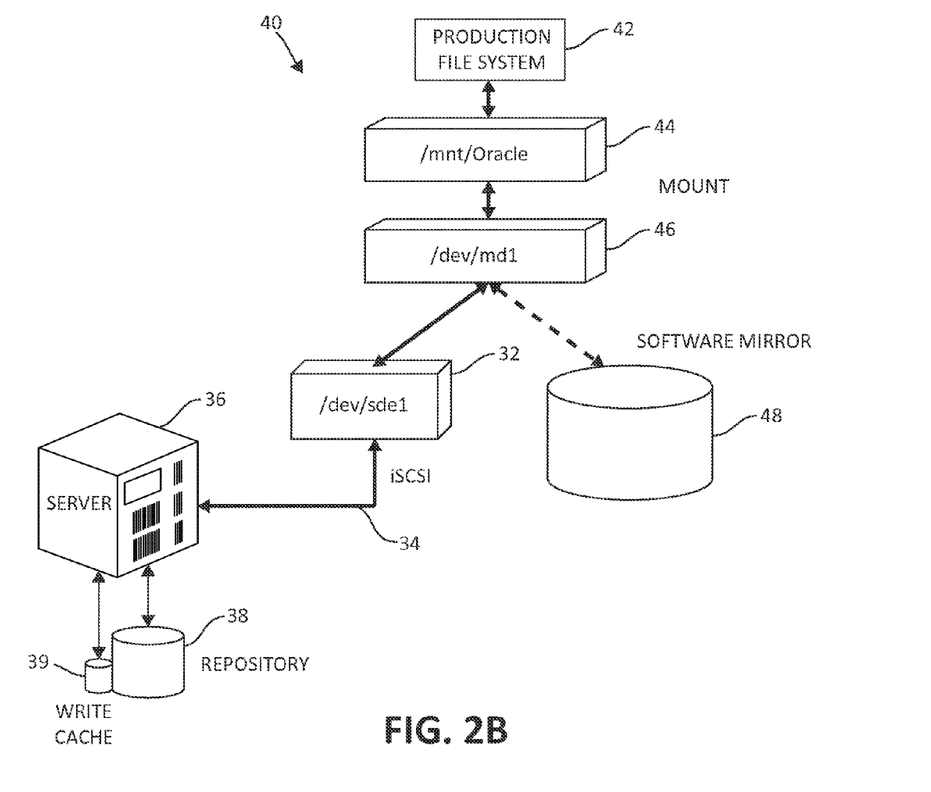
FIG. 2B is a block diagram of a second step in the exemplary method for restoring data first depicted in FIG. 2A.

FIG. 2B is a block diagram of a succeeding step 40 in the exemplary method for providing Instant Restore functionality as first depicted in FIG. 2A. In accordance with the presently illustrated embodiment, and again from the storage device having the target volume for Instant Restore, one or more commands from a common mirror software utility (such as mdadm in Linux®) are issued to create a new mirror device on top of the iSCSI exposed device. Here again, from the storage device that has the target volume for Instant Restore, a Linux® mount command is issued to expose file level information from the RAID device to production applications.

In view of the foregoing, server 36 is shown in communication between the applicable write cache 39 and the repository 38, in which the exposed LUN is hooked via the iSCSI channel 34 to device 32. The device representation 46 of the aforementioned mirror device of device 32 is seen, as well as the device representation 44 of the mount exposing the file level information from the RAID device to production applications via the production file system 42. In addition, software mirror volume 48 is seen, whose purpose will be further illustrated, following. At this point in the process, data may be accessed. Read operations travel through the iSCSI device 32 to the repository 38. Write operations travel through the iSCSI device 32 to the write cache 39.

Figure 2C:
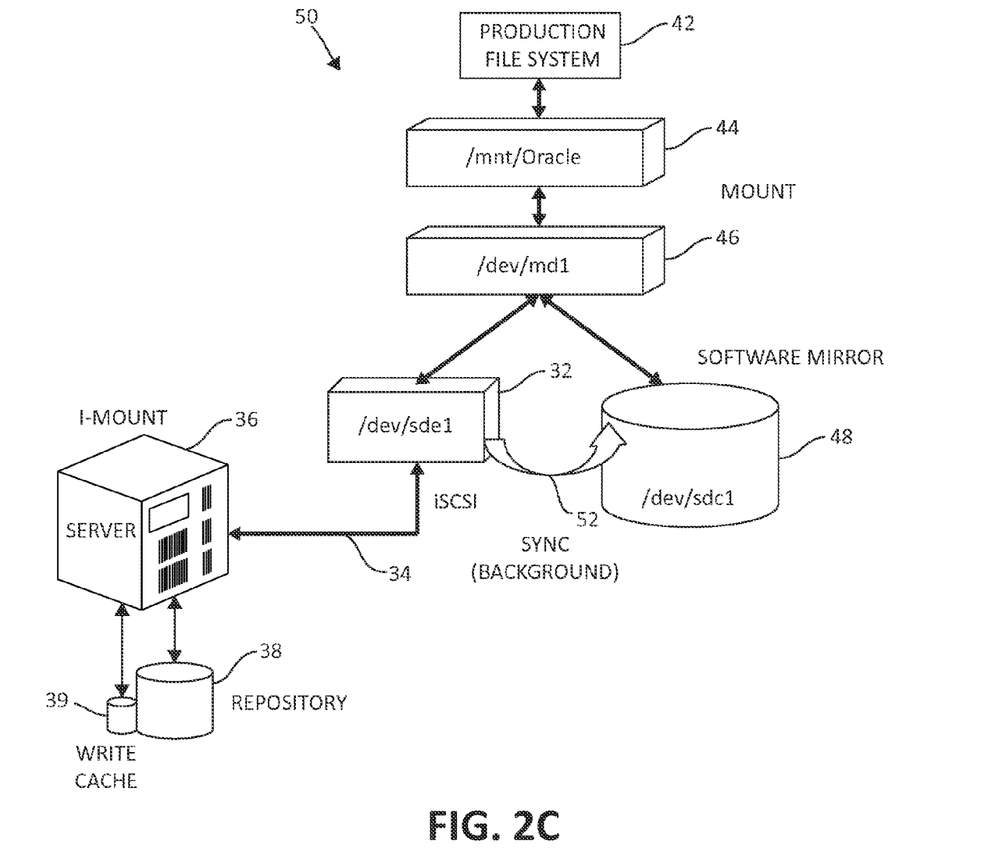
FIG. 2C is a block diagram of a third step in the exemplary method for restoring data first depicted in FIG. 2A.
Figure 2D:
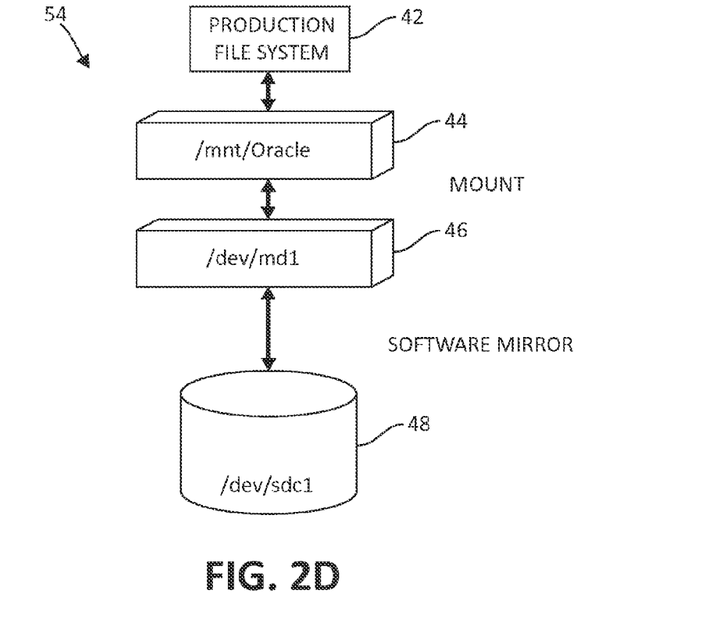
FIG. 2D is a block diagram of a fourth step in the exemplary method for restoring data first depicted in FIG. 2A.

In a following step in the exemplary method first depicted in FIG. 2A, and again from the storage device having the target volume for Instant Restore, a physical disk is added to the mirror set. This initiates a background process that syncs data from the iSCSI snapshot device into the real, physical disk. While this sync process is completing, a user may continue to read and write data. Turning now to FIG. 2C, this step 50 in the method is illustrated with the addition of physical disk as volume 48, and the background synchronization process 52 underway as shown. The synchronization process 52 may vary in length, as one of ordinary skill in the art will appreciate, according to size of the applicable production volume.

In one embodiment, the synchronization process 52 ensures that all data written to the write cache 39 is also written to the physical disk (i.e., volume 48). This includes data in addition to the original data existing on the physical disk before the synchronization process 52 commenced. Accordingly, the physical disk (again, volume 48) and the iSCSI device 32 contain exactly the same data. At this point, all write operations will be received on both the volume 48 and the iSCSI device 32, and all read operations may se served from each of the volume 48 and the iSCSI device 32 (as both devices contain the same data).

As a subsequent step, when the synchronization process described above is complete, the iSCSI device 32 may be removed. What remains is depicted in step 54 of FIG. 2D, following, where the production file system 42 is in communication through the devices 44 and 46 to the production physical disk 48 as shown.

Figure 2E:
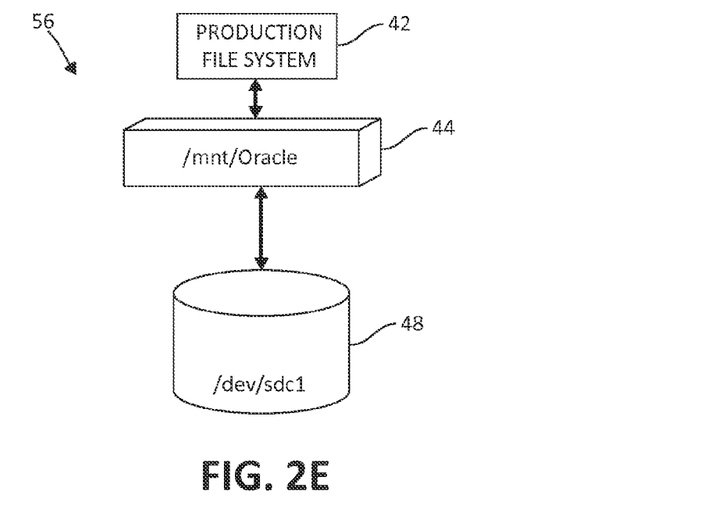
FIG. 2E is a block diagram of a fifth step in the exemplary method for restoring data first depicted in FIG. 2A.

When an opportunity arises to unmount and mount the file system (or during the next reboot of the system as an alternative), it becomes possible to remove the degraded RAID mirror device, and connect the production mount point directly to the new production disk as shown in step 56 of FIG. 2E, following. Here, the production file system 42 is directly mounted through device representation 44 to the physical disk 48. It is important to note in this regard that from the perspective of the production application, the same mount point is engaged as before. While step 56 is not a requirement, it may be advantageous to reduce clutter and potential performance overhead of the system.

Figure 3:
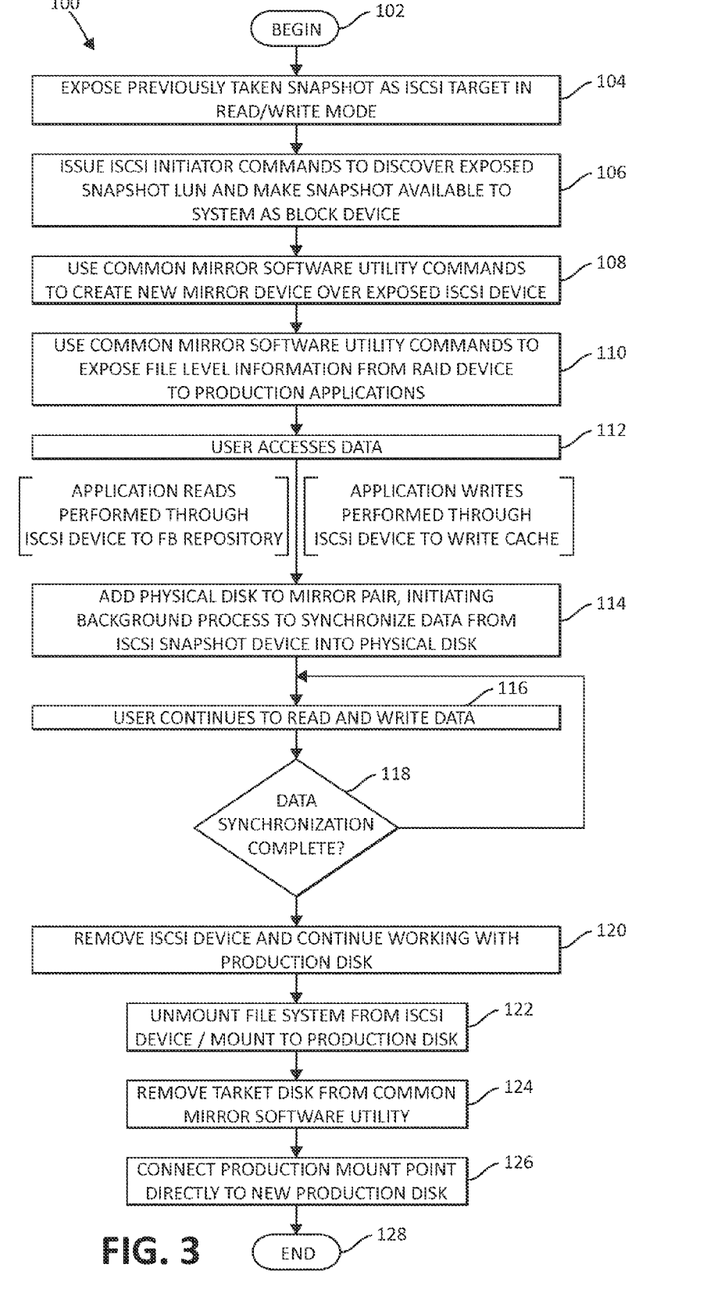
FIG. 3 is a flow chart diagram of an exemplary method for restoring data.

Turning to FIG. 3, a flow chart of an exemplary method 100 for providing improved Instant Restore functionality using aspects of the present invention as previously described is illustrated. As one skilled in the art will appreciate, various steps in the method 100 may be implemented in differing ways to suit a particular application. In addition, the described method 100 may be implemented by various means, such as hardware, software, firmware, or a combination thereof operational on or otherwise associated with the storage environment. For example, the method 100 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. While the method 100 is applicable to computer environments employing agents for data discovery and data movement, and including a server for data storage and cataloging, the skilled artisan will appreciate that the method 100 may be generalized to any network-based storage management mechanism.

Method 100 begins (step 102) with the exposure of a previously taken snapshot as an iSCSI target in read/write mode (step 104). iSCSI initiator commands are then issued to discover the applicable LUN of the snapshot, and to make the snapshot available to the system as a block device (step 106). Common mirror software utility commands are issued to create a new mirror device over the exposed iSCSI device (step 108). Common mirror software utility commands are used to expose file level information from the RAID device to production applications (step 110). At this point the user may access data (step 112). Application reads are performed through the iSCSI device to the repository (e.g., Fast- Back™), and application writes are performed through the iSCSI device to the write cache.

In a subsequent step, a physical disk is added to the mirror pair, initiating the background process to sync data from the iSCSI snapshot device into the physical disk (step 114). The user may continue to read and write data during this synchronization process (step 116), which again may vary according to a particular implementation. Once the data synchronization process is complete (step 118), the iSCSI device is removed, and the production disk continues to be accessed by the production applications (step 120). In an optional set of steps, the file system is unmounted from the iSCSI device, and mounted directly to the production disk (step 122), the target disk is removed from the common mirror software utility (step 124), and the production mount point is connected directly to the new physical production disk (step 126). The method 100 then ends (step 128).

Figure 4:
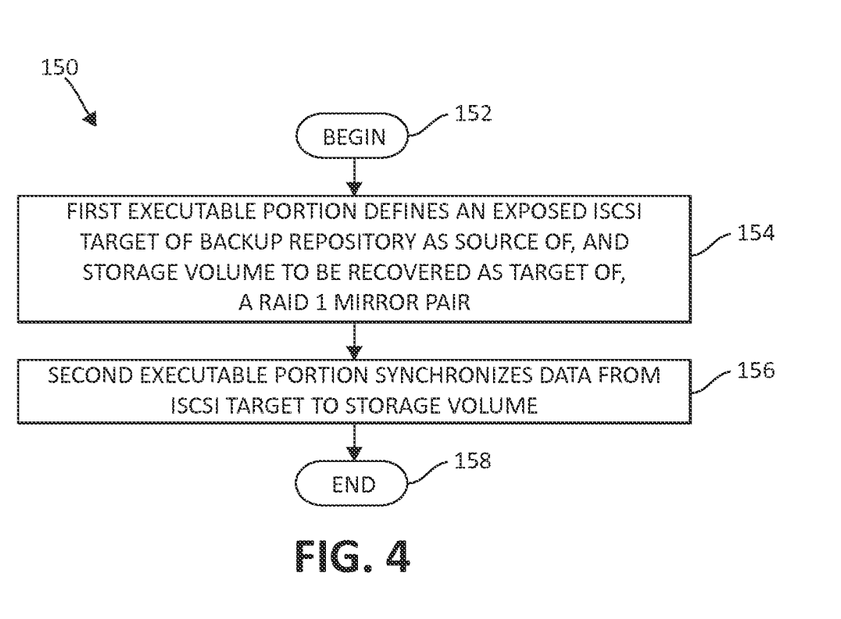
FIG. 4 is a flow chart diagram of an exemplary method for restoring data as performed using executable portions of a computer program product.

FIG. 4, following, is an additional flow chart diagram of various exemplary steps in a method 150 for performing improved Instant Restore functionality as implemented by a computer program product. Method 150 begins (step 152) with a first executable portion of the computer program product defining an exposed iSCSI target of a backup repository as a source of, and a storage volume to be recovered as a target of, a RAID 1 mirror pair (step 154). In a subsequent step, a second executable portion synchronizes data from the iSCSI target to the storage volume (step 156). The method 150 then ends (step 158).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for restoring data in a computing storage environment, comprising:
at least one processor device operable in the computing storage environment, wherein the at least one processor device is adapted for:
exposing an Internet Small Computer System Interface (iSCSI) target of a backup repository to a remote device, the iSCSI target comprising a point-in-time backup snapshot based on block-level image backups kept in the backup repository;
forming a mirror set for copying the iSCSI target to the remote device by issuing a command from a common utility mirroring application to create a mirror device on the exposed iSCSI target, wherein the iSCSI target is defined as a source and the remote device to be recovered as a target, the iSCSI target in communication with a write cache;
adding a physical disk to the mirror set, the physical disk coupled to the remote device to initiate synchronization of data from the iSCSI target to the physical disk;
synchronizing data from the iSCSI target to the physical disk including all data contained in the write cache, in response to the adding the physical disk;
while the data from the iSCSI target is being synchronized to the physical disk, continuing to access data from the iSCSI target wherein an application write operation is performed to the physical disk and to a write cache in the backup repository, and an application read operation for data having been synched is performed from the backup repository or the physical disk; and
subsequent to a completion of the synchronizing the data, splitting the mirror set, wherein application read operations are performed from the remote device and application write operations are performed to the remote device, unmounting a file system of a plurality of storage disks in the computing storage environment including applications, application data, and storage volumes of the file system from the iSCSI target and mounting the file system directly to a production disk, removing the iSCSI target from the common utility mirroring application, deleting the write cache and placing the remote device in a fully functional mode of operation.

2. The system of claim 1, wherein the remote device is defined as the target of a Redundant Array of Independent Disks (RAID) 1 mirror pair.

3. The system of claim 1, wherein the at least one processor device is further adapted for connecting to the iSCSI target.

4. The system of claim 1, wherein the at least one processor device is further adapted for, in exposing the iSCSI target, issuing an iSCSI initiator command to perform at least one of discover a Logical Unit Number (LUN) for the iSCSI target and make the iSCSI target available as a block device.

5. The system of claim 1, wherein the at least one processor device, in forming the mirror set, from the remote device is further adapted for issuing a mount command from the common utility mirroring application to expose file level information from the mirror set to a production application.

6. The system of claim 5, wherein the common utility mirroring application is mdadm, operable on a GNU/Linux distribution.

7. The system of claim 1, wherein the at least one processor devices is further adapted for, prior to a completion of the synchronization of the data:
performing an application read operation for data not yet synched with the remote device from the iSCSI target.

8. A computer program product for restoring data by a processor, the computer program product comprising a non-transitory machine-readable storage medium having computer-readable program code portions stored therein, the computer-readable program code portions comprising:
a first executable portion for exposing an Internet Small Computer System Interface (iSCSI) target of a backup repository to a remote device, the iSCSI target comprising a point-in-time backup snapshot based on block-level image backups kept in the backup repository;
a second executable portion for forming a mirror set for copying the iSCSI target to the remote device by issuing a command from a common utility mirroring application to create a mirror device on the exposed iSCSI target, wherein the iSCSI target is defined as a source and the remote device to be recovered as a target, the iSCSI target in communication with a write cache;
a third executable portion for adding a physical disk to the mirror set, the physical disk coupled to the remote device to initiate synchronization of data from the iSCSI target to the physical disk;
a fourth executable portion for synchronizing data from the iSCSI target to the physical disk including all data contained in the write cache, in response to the adding the physical disk;
a fifth executable portion for, while the data from the iSCSI target is being synchronized to the physical disk, continuing to access data from the iSCSI target wherein an application write operation is performed to the physical disk and to a write cache in the backup repository, and an application read operation for data having been synched is performed from the backup repository or the physical disk; and
a sixth executable portion for, subsequent to a completion of the synchronizing the data, splitting the mirror set, wherein application read operations are performed from the remote device and application write operations are performed to the remote device, unmounting a file system of a plurality of storage disks in the computing storage environment including applications, application data, and storage volumes of the file system from the iSCSI target and mounting the file system directly to a production disk, removing the iSCSI target from the common utility mirroring application, deleting the write cache and placing the remote device in a fully functional mode of operation.

9. The computer program product of claim 8, wherein the mirror set includes a Redundant Array of Independent Disks (RAID) 1 mirror pair.

10. The computer program product of claim 8, further including a seventh executable portion for connecting to the iSCSI target.

11. The computer program product of claim 10, further including an eighth executable portion for issuing an iSCSI initiator command to perform at least one of discover a Logical Unit Number (LUN) for the iSCSI target and make the iSCSI target available as a block device.

12. The computer program product of claim 10, further including an eighth executable portion for, in forming the mirror set further includes, from the remote device
  issuing a mount command from the common utility mirroring application to expose file level information from the mirror set to a production application.

13. The computer program product of claim 10, further including an eighth executable portion for, prior to a completion of the synchronization of the data:
  performing an application read operation for data not yet synched with the remote device from the iSCSI target.

\* \* \* \* \*